Nov. 9, 1965 W. E. KOHMAN 3,216,440
FLAPPER TYPE HYDRAULIC SERVO VALVE
FOR CONTROLLING FLUID FLOW
Filed Aug. 27, 1962 2 Sheets-Sheet 1

INVENTOR.
WAYNE E. KOHMAN
BY
William V. Ebs
HIS ATTORNEY

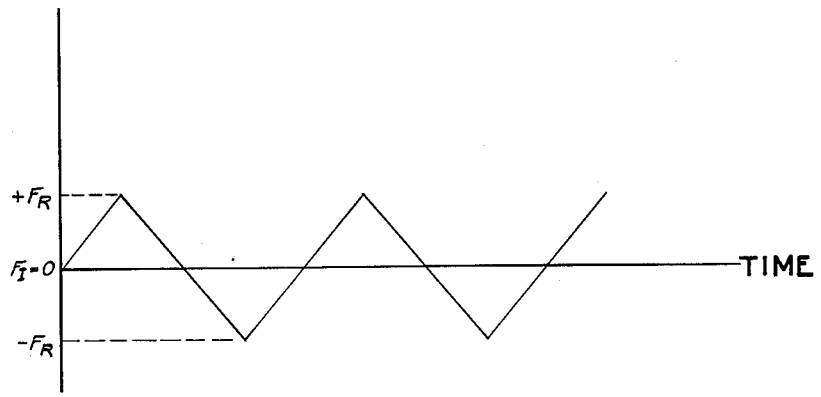
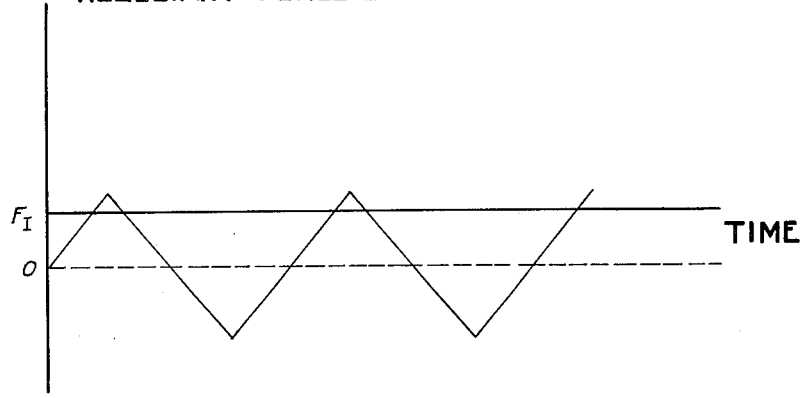

3,216,440
FLAPPER TYPE HYDRAULIC SERVO VALVE
FOR CONTROLLING FLUID FLOW
Wayne E. Kohman, Morris Plains, N.J., assignor to Curtiss-Wright Corporation, a corporation of Delaware
Filed Aug. 27, 1962, Ser. No. 219,468
2 Claims. (Cl. 137—82)

My invention relates to hydraulic servo valves and is particularly directed to an improved hydraulic servo valve operable to schedule flow as a function of a force input.

Mechanically actuable hydraulic servo valves designed for high fluid pressure and low flow are generally expensive. Valve parts must be closely fitted to control leakage and this results in high manufacturing costs. Furthermore, these valves are calibrated by machining the valve spool and cylinder liner. Valve underlap, overlap, and port contour determine the response characteristics of the valve and dimensions must be controlled with extreme precision, thereby further adding to the cost of manufacture. When a valve fails to meet calibration limits it cannot be conveniently recalibrated by the user, but must be returned to the manufacturer for expensive replacement, or modification of the spool valve. In addition, because of the close fitting parts required to control leakage, friction and dirt sensitivity are potential sources of trouble.

It is an object of the invention to provide a mechanically actuable hydraulic servo valve which is insensitive to small particles of foreign matter in the operating fluid.

It is another object of the invention to provide such a valve which can be readily calibrated without the necessity of performing machining operations on parts thereof.

It is another object of the invention to provide such a valve in which response characteristics can be varied by simple adjustment of readily accessible parts.

It is still another object of the invention to provide a mechanically actuable hydraulic servo valve which is less expensive and more reliable than presently available units.

It is yet another object of the invention to provide an improved hydraulic servo valve for scheduling flow as a function of a force input signal.

Other objects and advantages of the invention will become apparent during a reading of the specification taken in connection with the accompanying drawings in which:

FIG. 2 is a graph showing a resultant force acting on a member of the servo valve in the absence of an input signal and;

FIG. 3 is a graph similar to that of FIG. 2 showing such resultant force in the presence of an input signal.

Figure 1:
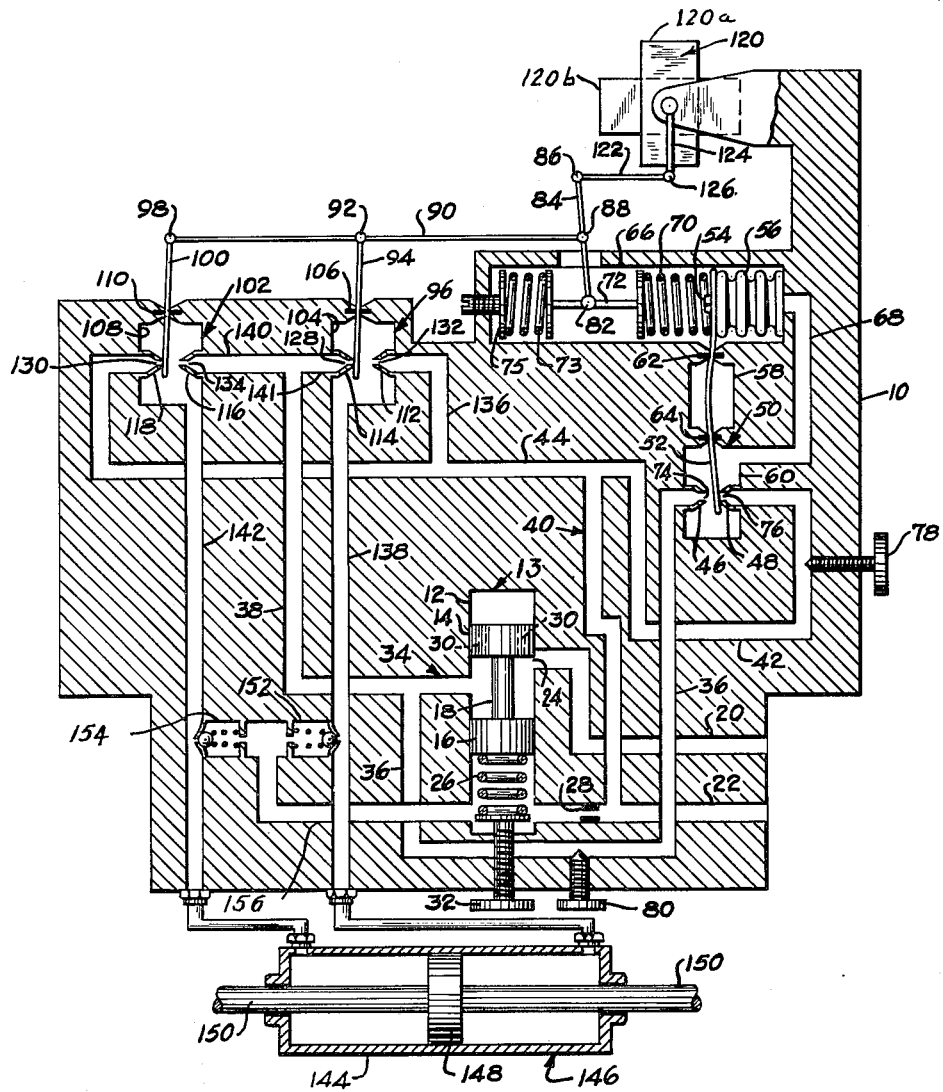
FIG. 1 is a schematic sectional view of a hydraulic servo valve and actuator according to the invention.

Referring to FIG. 1, reference character 10 designates the housing of the hydraulic servo valve. As shown, the housing has a bore 12 therein for a differential pressure regulating valve 13 which includes valve spools 14 and 16 connected by axially reduced diameter portion 18. The bore 12 connects with conduit 20 through which fluid under pressure is supplied to the hydraulic servo valve, and connects with conduit 22 through which fluid is drained from the servo valve. Conduits 20 and 22 respectively connect with a source of fluid pressure (not shown) and transfer lines (not shown) for returning drained fluid to the pressure source. Valve spool 14 which normally extends across a portion of port 24 through which the bore 12 connects with conduit 20 is positioned to maintain a difference between fluid pressure on opposite sides of valve spool 16 substantially independent of variations in the pressure at which fluid is supplied to the servo valve by way of conduit 20 and in the pressure at which fluid is drained from the servo valve via conduit 22. If pressure in conduit 20 increases, fluid pressure in bore 12 increases on the one side of spool 16 (the upward side as viewed in the drawing) and the valve spools move downwardly against the bias of spring 26 such that valve spool 14 covers more of the area of port 24 and reduces the flow of fluid through the port. If pressure in line 20 decreases, valve spool 14 moves to open the port 24. As soon as pressure in conduit 22 on the upstream side (to the left) of orifice 28 increases, the valve spools move upwardly to open port 24 and increase pressure on the upward side of spool 16. If pressure in conduit 22 on the upstream side of orifice 28 decreases, the valve spools move downwardly decreasing the open area of port 24, and pressure on the upward side of spool 16 decreases. Pressure on opposite sides of valve spool 14 is maintained at the same level by the openings 30 which extend through the spool. The spring 26 may be preloaded in the extent desired by means of screw 32 to establish a selected value for the difference between pressure on the one side of spool 16 and pressure on the other side.

Extending from bore 12 on the upward side of valve spool 16 is a supply line 34 which includes branches 36 and 38. A drain line 40 connects through orifice 28 with the bore 12 on the other side of spool 16. Such drain line 40 includes branches 42 and 44. Branch 36 of the supply line and branch 42 of the drain line extend to nozzles 46 and 48 respectively of a valve 50 which also includes flexible stem 52. The valve stem 50 attaches at one end, that is, at 54 to pressure responsive mechanism as bellows 56 and extends through bore 58 into bore 60 where the lower end portion co-operates with the nozzles 46 and 48. Stem 50 is supported on seals 62 and 64 as shown. The bellows 56 shown located in bore 66 connects by way of conduit 68 with bore 60. A spring 70 which bears against a member 72 slidable within bore 66 and against the upper end portion of valve stem 52, urges bellows 56 to the right as viewed in the drawing. A spring 73 of sufficiently low rate such that it exerts substantially constant force on member 72 during operation of the device, is provided between member 72 and an adjustable member 75. Such spring urges the member 72 to the right in bore 66.

With conduit 20 connected to a suitable source of fluid pressure such as a pump, flexible stem 52 of valve 50 is moved by bellows 56 such that the lower portion of the stem alternately opens and closes each of the ports 74 and 76 of the nozzles 46 and 48 respectively. The bellows 56 connects through conduit 68 either with branch 36 of supply line 34 or with branch 42 of drain line 40, depending upon the position of flexible stem 52. When the bellows connects with branch 36 of the supply line as shown in the drawing, fluid pressure within the bellows is caused to increase, whereupon the bellows moves to the left against the bias of spring 70 to actuate valve stem 52 which then deflects such that the lower portion of the valve stem moves to open port 76 of nozzle 48 and close port 74 of nozzle 46. The bellows 56 then connects with branch line 42 of the drain line 40 and pressure within the bellows decreases whereupon spring 70 acts to move the bellows to the right. As a result, the valve stem 52 is deflected to open port 74 of nozzle 48 and close port 76 of nozzle 46. The cyclic operation of valve 50 continues so long as the pressure differential between the supply and drain lines is maintained. Flow in branch lines 42 and 36 can be controlled by adjustable screws 78 and 80 respectively to vary the frequency with which the valve stem 52 is actuated to contact and close off the ports of nozzles 46 and 48.

Member 72 pivotally connects at 82 with a member 84 to which input signals are applied at 86. As shown, member 84 pivotally connects between the ends thereof and outside housing 10 at 88 with a link 90. The link 90 pivotally connects at 92 with a valve stem 94 of a flapper valve 96, and at 98 with a valve stem 100 of a flapper valve 102. Stem 94 extends into bore 104 and may pivot on seal 106 which supports the stem between its ends. Stem 100 extends into the bore 108 and may pivot between the ends thereof on seal 110. The valve 96 includes nozzles 112 and 114 which co-operate with valve stem 94, and the valve 102 includes the nozzles 116 and 118 which co-operate with valve stem 100. A small gap separates the nozzles 112 and 114 as well as the nozzles 116 and 118 such that slight movement of link 90 causes each of the valve stems 94 and 100 to bear against one or the other of the nozzles with which it co-operates depending upon the direction of movement of the link. The gap between the nozzles may, for example, be of the order of magnitude of five thousandths of an inch (.005 in.).

Member 72 is shown connected to a high inertia actuating device, that is, rate gyro 120, through a link 122 that pivotally connects at 86 with link 84 and a link 124 that pivotally connects at 126 with the link 122. Other actuating devices having a force output might, however, be substituted for the gyro. A solenoid with the armature connected to the link 122 for exerting a force thereon proportional to input current might, for example, be used. During the cyclic operation of valve 50, member 72 is moved slightly to the right and left in bore 66 and member 84 is caused to oscillate about the pivotal connection at 86 without oscillatory motion being imparted to actuating device 120 because of the high inertia thereof. Oscillatory motion is, however, imparted to valve stems 94 and 100 by member 84 acting through link 90 and each valve stem moves to repetitively open and close each of the ports of the nozzles with which the stem co-operates. When member 72 moves to the right, stem 94 pivots on seal 106 to close port 128 of nozzle 114 and valve stem 100 pivots on seal 110 to close port 130 of nozzle 118. The valve stems 94 and 100 are shown in FIG. 1 in positions in which the said ports 128 and 130 are closed. These ports 128 and 130 are opened when member 72 moves to the left, and the ports of nozzles 112 and 116 are closed, the valve stem 94 pivoting on seal 106 to a position in contact with the nozzle 112 and the valve stem 100 pivoting on seal 110 to a position in contact with the nozzle 116. When port 132 of nozzle 112 and port 134 of nozzle 116 are open, branch 44 of the drain line 40 connects through branch conduit 136, nozzle 112 and bore 104 of flapper valve 96 with line 138, and branch 38, of supply line 34 connects through branch conduit 140, nozzle 116 and bore 108 of flapper valve 102 with hydraulic line 142. Line 138 connects with a cylinder 144 of an actuator 146 on one side of a piston 148, and the line 142 connects with the cylinder 144 on the other side of piston 148. Fluid from drain line 40 is, therefore, supplied through line 138 to the one side of piston 148 of the actuator and fluid from supply line 34 is supplied through line 142 to the other side of the piston 148 when the ports 132 and 134 of nozzles 112 and 116 respectively are open. Because of the pressure unbalance in the actuator, piston 148 and shaft 150 secured thereto, tends to move towards the right in cylinder 144 at such time. When port 128 of nozzle 114 and port 130 of nozzle 118 are open, branch 38 of supply line 34 connects through branch conduit 141, nozzle 114, bore 104 of flapper valve 96 and hydraulic line 138 with the cylinder 144 of actuator 146 on the one side of piston 148, and branch 44 of drain line 40 connects through nozzle 118, bore 108 of flapper valve 102 and line 142 with the cylinder 144 on the other side of piston 148. Pressure unbalance on piston 148 acts to move piston 148 and shaft 150 to the left due to the fact that fluid is supplied to the cylinder 144 on the right side of piston 148 from the supply line and to the left side of the piston from the drain line.

In the absence of an input signal to the servo valve and with member 75 adjusted to properly preload spring 73, a graph of the resultant force exerted on member 72 by springs 70 and 73, due to the action of bellows 56, is symmetrical about the line denoting zero force and may be illustrated as in FIG. 2. The resultant force acts on member 72 in one direction for a period of time and then in the opposite direction for the same period of time. Ports 132 and 134 of nozzles 112 and 116 are, therefore, repetitively opened by valve stems 94 and 100 respectively for the same length of time that ports 128 and 130 of nozzles 114 and 118 are repetitively opened by said valve stems as they are oscillated about their pivotal mountings by member 72 acting through link 90; and piston 148 is urged successively by reason of the pressure differentials which result between lines 138 and 142 in opposite directions for equal periods of time. At the normal frequency of oscillation of member 72 and corresponding resulting frequency of cyclic variations in pressure in lines 138 and 142 which may, for example, be of the order of magnitude of five to ten cycles per second, ordinarily no substantial net movement of the piston 148 results in the absence of an input signal at 86, because of the flow restriction produced by orifices 128, 132, 130, and 134 as well as the inertia of the piston 148 and shaft 150 plus the load to which the shaft may connect.

When in input force signal is applied to member 84 at 86 as by gyro gimbal 120a acting through links 124 and 122, such as would result upon the tilting of housing 10 and gyro wheel 120b about a horizontal axis in the plane of the drawing, the resultant force on member 72 varies with respect to the line representing the input force $F_I$ as shown, for example, in FIG. 3. It is apparent from FIG. 3 that the resultant force acts on member 72 with respect to the input force for one period of time in one direction and for a different period of time in the opposite direction. Resulting deflections of member 72 are such that the flapper valve stems 94 and 100 are actuated by the member 72 acting through link 90 in such fashion that ports 132 and 134 are repetitively opened for a different period of time than are the ports 114 and 118. Consequently resulting recurrent pressure differences in lines 138 and 142 tending to move piston 148 in cylinder 144 in one direction persist for a longer period of time than the resulting recurrent pressure differences tending to move the piston in the other direction and net motion of the piston, attached shaft 150 and connected load, result. The direction in which the piston moves depends upon the direction of the input force signal at 86, and the rate at which said piston moves is proportional to the magnitude of such input signal.

Preferably check valves such as designated by reference characters 152 and 154 are provided through which the lines 138 and 142 are respectively connectable with a line 156 that communicates with cylinder 12 below valve spool 16. Fluid is supplied to line 156 through check valve 152 at the pressure in line 138 when the position of valve stem 94 of flapper valve 96 is such that the line 138 connects with the supply line 34, and fluid is supplied to line 156 at the same pressure through check valve 154 when the position of the valve stem 100 of flapper valve 102 is such that line 142 connects with supply line 34. Whenever one of the check valves 152 or 154 is open the other check valve is closed. In the event pressure in either line 138 or 142 is increased due to load reaction on shaft 150 flow is increased through the check valve 152 or 154 respectively and such increased pressure is reflected in line 156, in the cylinder 12 below valve spool 16, and in an increased pressure drop across orifice 28. The valve spools 14 and 16 adjust as the result of the pressure increase in cylinder 12 below valve spool 16 moving upwardly, thereby causing valve spool 14 to uncover more of the port 24 and raise pressure in supply line 34 such that a constant difference is maintained between the pressure on opposite sides of valve spool 16 and flow into the actuator cylinder 144 from lines 138 and 142 is undisturbed by the load reaction. The check valves by providing for load compensation as described, contribute to the maintenance of the aforementioned proportional relationship between the force input signal and the rate of movement of the actuator piston 148.

The disadvantages inherent in conventional spool valves are avoided in the mechanically actuable hydraulic servo valve of the invention. In spool valves flow is metered by precisely scheduling an area for each flow value, and in scheduling very small rates of flow a practical limit is reached when the scheduled area approaches the magnitude of the area formed by diametral clearances between the spool and liner that controls leakage. Also, flow errors due to overlap or underlap of the metering spool and liner ports result. Required tolerance limits in fabrication of the spool and liner become extremely difficult to meet and the valves are sensitive to contamination. In the mechanically actuable servo valve of the invention however, flow is metered by controlling the duration of pulses of flow that alternate in direction. The magnitude of flow during the pulses is constant, being controlled by the fixed area orifices which are either fully opened or fully closed, that is, the nozzle orifices of flapper valves 96 and 102. The precise machining and contamination problems are, therefore, not encountered. Furthermore, conventional spool valves are calibrated by machining the spool and liner, and must ordinarily be returned to the manufacturer when recalibration is required. The initial cost of calibration is reduced in the valve of the invention and it can be conveniently recalibrated in the field merely by adjusting differential pressure with screw 32.

In low flow circuits hydraulic pressure is frequently provided by positive displacement pumps with by-pass regulating valves. With the servo valve of the invention in such a low flow circuit, flow would be maintained practically constant regardless of load reactions to provide better pressure regulation and minimize problems of sump heat rejection.

Although only one form of the invention has been shown and described, it will be apparent to those skilled in the art that various changes and modifications may be made in the mechanism without departing from the spirit and scope of the invention. In particular, the check valves 152 and 154, and the differential pressure regulating valve 13 might be omitted from the servo valve of the invention. While these components contribute to the performances of the valve by compensating for various pressure changes it might be desirable to eliminate them where cost and weight are critical matters. For other installations their functions would be essential.

The appended claims are intended to cover all changes and modifications within the scope of the invention.

I claim:

1. Flow control apparatus comprising a pair of flapper valves each embodying a chamber which includes a supply port, a drain port and a constantly open outlet port; a supply line connected to the supply port of each valve; a drain line connected to the drain port of each valve; one outlet line connected to the outlet port of one valve and another outlet line connected to the outlet port of the other valve; a control element for each valve having a first position in which the supply port is closed but the drain port is open, and having a second position in which the supply port is open but the drain port is closed; pressure responsive means operatively connected with said control elements for repetitively alternating the positions of the control elements between said first and second positions and disposing the control element of one valve in one of the said first and second positions whenever the control element of the other valve is in the other of said positions; a control valve embodying a chamber which includes a supply port connected with the said supply line, a drain port connected with the said drain line, and a constantly open port; a line connecting the constantly open port of said control valve with the pressure responsive means for supplying pressurized fluid thereto; a control member for the said control valve mechanically connected to the pressure responsive means for actuation thereby, said control member having alternate positions in one of which the supply port of the control valve is open but the drain port is closed and in the other of which the supply port is closed but the drain port is open such that the pressure responsive means is actuated to move the control member when in one of the alternate positions to the other position.

2. Flow control apparatus as defined in claim 1 including means in the drain line for adjusting the frequency at which the control elements of the flapper valves are operated by the pressure responsive means.

References Cited by the Examiner

UNITED STATES PATENTS

| | | | |
|---|---|---|---|
| 2,423,935 | 7/47 | Hart | 121—38 XR |
| 2,455,315 | 11/48 | Rose et al. | 121—41 |
| 2,681,116 | 6/54 | Treseder | 121—38 XR |
| 2,775,254 | 12/56 | Stanbury | 121—46.5 XR |
| 2,825,308 | 3/58 | Klee | 121—46.5 |
| 2,856,947 | 10/58 | Hart | 91—51 X |
| 2,881,740 | 4/59 | Ensinger | 121—46.5 |
| 2,924,200 | 2/60 | Hanna et al. | 91—459 X |
| 2,981,274 | 4/61 | Wennerberg et al. | 137—85 |

FOREIGN PATENTS

| | | |
|---|---|---|
| 900,424 | 10/44 | France. |
| 873,114 | 7/61 | Great Britain. |

ISADOR WEIL, *Primary Examiner.*

FRED E. ENGELTHALER, WILLIAM F. O'DEA,
*Examiners.*